April 18, 1961  J. L. ROMAND ET AL  2,980,798
SPECTRUM ANALYSIS APPARATUS
Filed Aug. 2, 1957  7 Sheets-Sheet 1

United States Patent Office 2,980,798
Patented Apr. 18, 1961

2,980,798
SPECTRUM ANALYSIS APPARATUS

Jacques Louis Romand, Bourg-la-Reine, and Boris Vodar, Paris, France, assignors to Centre National de la Recherche Scientifique, Paris, France, a French society Filed Aug. 2, 1957, Ser. No. 675,878
Claims priority, application France Nov. 9, 1956
12 Claims. (Cl. 250—83.3)

The present invention relates to emission spectrum analysis apparatus.

The conventional apparatus of this kind make use of sources constituted by arcs or sparks in which the material to be analyzed is introduced. Such apparatus are very sensitive.

But with the apparatus used at the present time it is possible to analyze only substances having ionization potentials lower than approximately 10 volts and the spectral lines of which have wavelengths higher than 2000 Angstroms. About 70 elements comply with these conditions, but important bodies are among the exceptions, for instance metalloids such as sulfur, phosphorus and carbon. In the case of these bodies, the brighter lines are in the range called "remote ultra-violet," that is to say have wavelengths lower than 2000 Angstroms. Furthermore, these lines are emitted by ions of high degree of ionization, which are not produced by the usual sources.

In order to cover the whole spectrum range from 2000 Angstroms to soft X-rays, the source must work in a vacuum since the presence of a gas, even more transparent than air to these rays, unavoidably produces a wavelength limitation. Now a spark in a vacuum generally does not comply with the conditions required for analysis for different reasons among which are the instability of the spark, the small distance between the electrodes and the necessity of using very high potentials.

The object of the present invention is to provide a spectrum analysis apparatus which obviates the above mentioned drawbacks and which permits of detecting and measuring elements having a high ionization potential. The characteristics of this apparatus will result from the following detailed description of preferred embodiments thereof, with reference to the appended drawings, given merely by way of example and in which:

The apparatus according to our invention makes use of a spark produced between two electrodes but which travels along an insulator or semi-conductor support located between said electrodes. The insulating or semi-conductor substance may advantageously act as a support for the electrodes. Experience teaches that when the electrodes are in contact with a support, a potential front is propagated along said support, the spark sliding thereon, and it is possible to obtain in a vacuum relatively long sparks (several millimeters) for potentials which are relatively not very high (from 20 to 30 kv.). The spectrum that is observed includes lines of the material constituting the electrodes and lines of the elements of the support. These lines belong to the spectra of atoms several times ionized and there are but little or no arc lines. The radiations emitted by the particles torn away from the support must not be a cause of error.

Preferably, the insulating substances are constituted by refractory oxides of metals the spectra of which contain a relatively small number of lines, such as alumina for instance. Other materials may be used provided that the electrical resistance between the electrodes is sufficient to ensure the passage of the sliding electrode, that is to say equal to some thousands of ohms.

Figure 1:
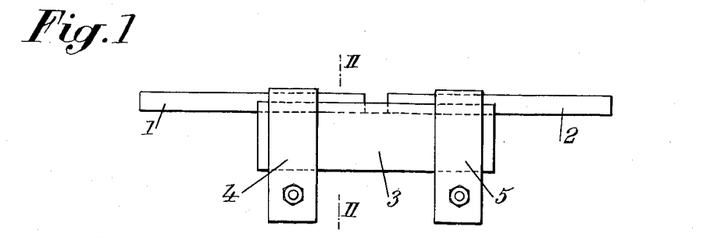
Fig. 1 is an elevational view of a source of radiations according to this invention.

In the spark producing device of Fig. 1, the conductor electrodes 1 and 2 are tightly held in a longitudinal groove provided in piece 3 acting as support, by means of strips 4 and 5.

Figures 2, 3, 4:
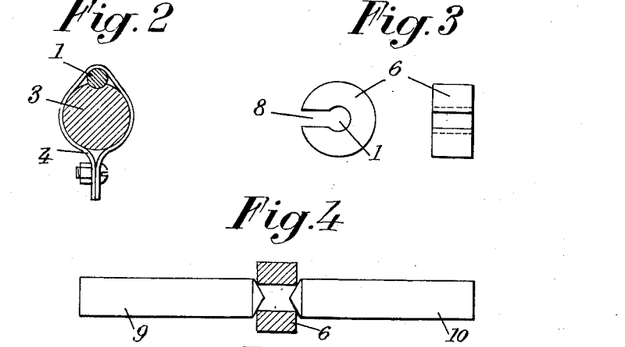
Fig. 2 is a sectional view on the line II—II of Fig. 1.
Fig. 3 shows the piece acting as support for the spark which constitutes the source of radiations in the embodiments illustrated by Figs. 4 and 5.
Fig. 4 is a view partly in section of an embodiment of the spark producing means, according to our invention.

As shown by Fig. 2, support 3 is provided with a groove in which are engaged the electrodes such as 1, so as accurately to determine their position.

Figures 5, 6:
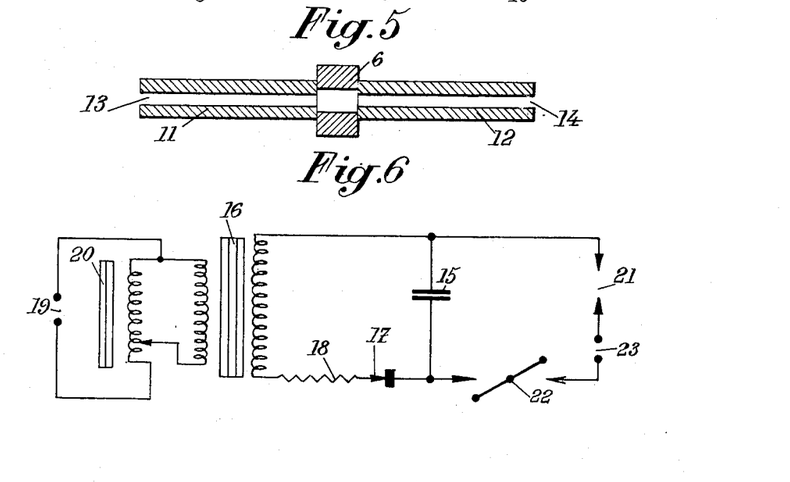
Fig. 5 is a sectional view of a modification corresponding to the case where it is desired to obtain an emission spectrum of non-conducting substances.
Fig. 6 shows the electric lay-out for the production of a spark according to our invention.

Fig. 3 shows in end view and in front view the part acting as support in devices of the kind illustrated by Figs. 4 and 5. This part is constituted by a portion of a tube 6 the axial hole 7 of which communicates with a lateral slot 8 through which the radiations are observed.

In the construction of Fig. 4, this piece 6 is tightly held between electrodes 9 and 10 the ends of which are of conical shape (they might also be of semi-spherical shape), so as to engage in the hole 7 of piece 6.

Fig. 5 shows an arrangement which permits of obtaining the emission spectrum of substances which are not conductors of electricity. The electrodes 11 and 12 are provided with an axial channel 13—14 in which the substance to be studied, previously reduced into the state of powder, is tightly packed. The ends of the electrodes are flat and applied against the sides of the insulating piece 6. Suitable spring means apply the electrodes (9—10 in the case of Fig. 4 and 11—12 in the case of Fig. 5) against piece 6. Said spring means are not shown on the drawings.

One of said devices for producing a sliding electrode (Fig. 1, Fig. 4 or Fig. 5) or any other device of the same kind, is placed in a spark chamber where the pressure of the residual gases is lowered to a value such that the discharge in said gases is negligible as compared with the spark proper.

Fig. 6 shows the electrical lay-out of such an apparatus. Condenser 15 is charged by means of transformer 16 through rectifier 17 and resistor 18. The electrical energy is supplied by an alternative source 19 (not shown in detail). The charging voltage of 15 is adjusted by means of a variable ratio auto-transformer 20. Condenser 15 discharges into the sliding spark produced in vacuum 21 through a control device 22, in series with 21. This arrangement permits the spark to flow through 21 only when the desired voltage is reached across the terminals of 15. The rate of repetition of the sparks supplied by device 22 must be sufficiently slow to enable the voltage across 15 to reach its maximum value before each spark takes place.

By way of nonlimitative example, 22 may be constituted by a rotary spark gap device driven at constant speed. At 23 there may be placed either a conductor, or a resistance, or a self-inductance coil, according to which electrical characteristics are desired for the discharge circuit.

By way of practical examples, the following characteristics have given good results:

Distance between electrodes: 3 millimeters.
Diameter of the electrodes in the case of Fig. 1: 3 millimeters.
Diameter of the support in the case of Fig. 1: 9 millimeters.
Diameter of the electrodes in the embodiments of Figs. 4 and 5: 6 millimeters.
Diameter of hole 7: 3 millimeters.
Width of slot 8: 2 millimeters.
Diameter of channel 13—14: 2 millimeters.
Capacity of 15: 1 microfarad.
Direct voltage across 15: 25 kilovolts.
Rate of production of the sparks: approximately one per second.

An embodiment of an apparatus according to our invention is illustrated by Figs. 7 to 16.

This apparatus essentially includes a casing constituted by a cylindrical portion 24 having a vertical axis (perpendicular to the plane of Figs. 7 and 9), said cylindrical casing being closed by an upper cover 25 and a lower cover 26. The cylindrical portion 24 of this casing is provided with three openings including flanges 27, 28 and 29. In portion 24, there is provided a rigid plate 30 which carries all the elements of the optical system, to wit the entrance slit, the diffraction grating, the exit slits, etc. This rigid plate 30 is carried by the portion 24 of the casing at three points 31, 32 and 33. The fixation at 32 and 33 permits slight horizontal displacements of plate 30 with respect to the casing. The elements of the optical system which will be hereinafter described are supported by said inner plate 30 which is very rigid and mechanically independent of the external elements, so that when a vacuum is formed in the casing, said optical elements are mechanically independent of possible deformations of the parts 24, 25 and 26 of the casing.

The whole of the casing and of the elements which may be fixed on flanges 27, 28 and 29 is arranged in such manner as to constitute a gas-tight container in which the pressure may be lowered to a value such that radiations of short wavelengths are not absorbed.

The elements which constitute the optical system are of two kinds. There are fixed elements which include the means for forming what has been called a sliding spark at 34, the entrance slit 35 and the diffraction grating 36. The light rays supplied by spark 34 pass through slit 35, reach grating 36 and are diffracted in different directions according to their respective wavelengths. Grating 36 is engraved on a concave surface, the images of slit 35 corresponding to radiations of different wavelengths being formed on a circle 37, called "Rowland circle" (Figs. 7 and 9), which is tangent to the grating at the apex thereof. Slit 35 is located on this circle in order to obtain sharp images free from deformations. The end images for the spectrum that is being considered are formed between point 38 (for the wavelength of 0 Angstrom) and point 39 (for the wavelength of 2900 Angstroms for instance). Of course, the numerical example has no limitative character and other limit wavelengths may be used with other gratings. Point 38 will be hereinafter called "central spot."

The images of the entrance slit formed between points 38 and 39 may be received through photographic means or photo-electric means. Such means constitute the variable or interchangeable elements of the apparatus which may be mounted at will on the big rectangular flange 29.

Figure 8:
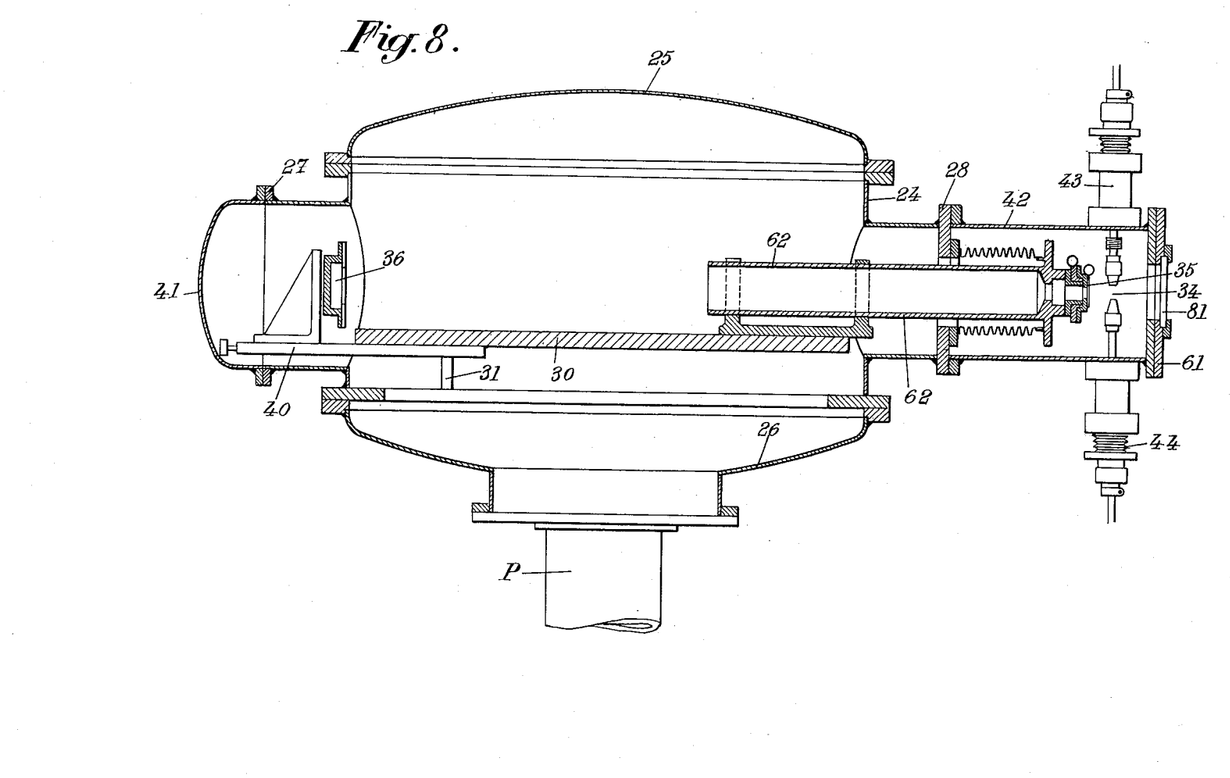
Fig. 8 is a vertical sectional view on the line VIII—VIII of Fig. 7.
Figure 9:
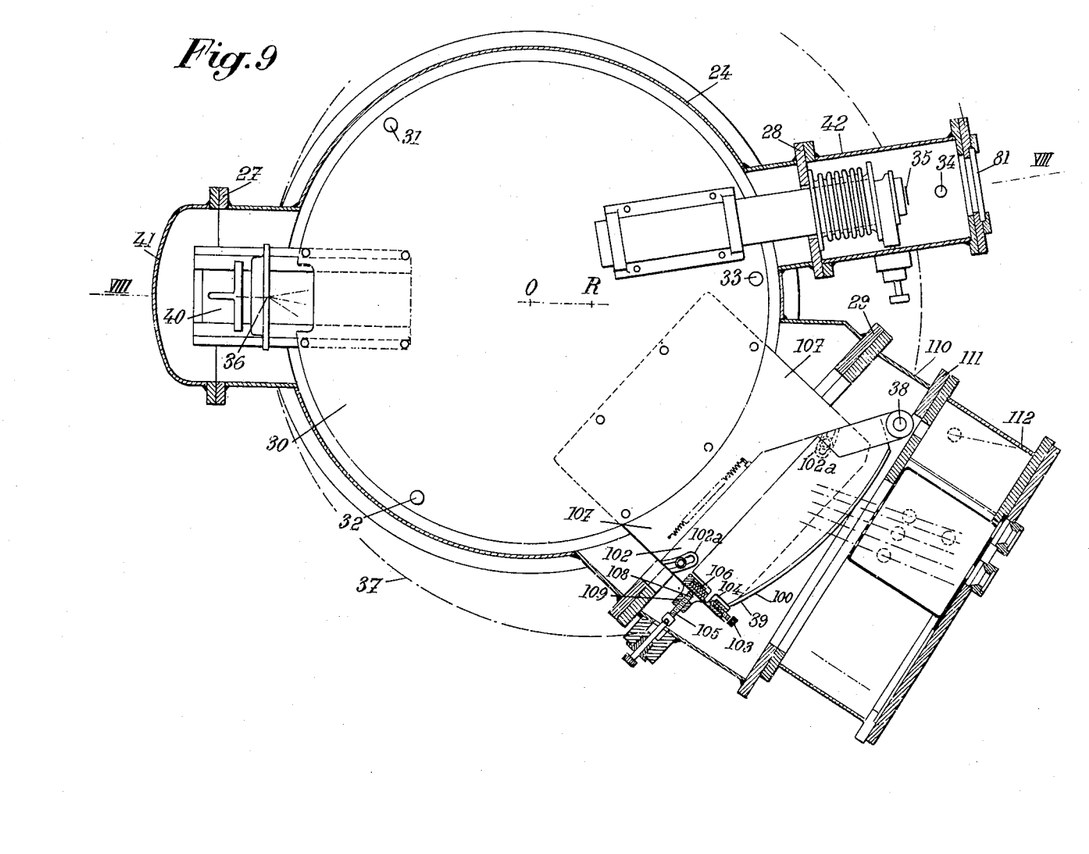
Fig. 9 is a view similar to Fig. 7 but in which photographic receiver means have been substituted for the photographic means illustrated by Fig. 7.

Fig. 8 is a plan view of the apparatus fitted with the photographic receiver means. Fig. 9 is a plan view of the same apparatus fitted with photo-electric receiving means.

We will now describe the various parts of the apparatus.

Flange 27 is intended to give easy access to the support 40 of the diffraction grating 36. As a rule, this support carries means (not shown on the drawings) for adjusting the position and the direction of the grating. Such means may be of any suitable conventional construction. When such adjustments have been performed, the aperture limited by flange 27 is closed by a cap 41.

Flange 28 (Figs. 7, 8, 9 and 10) permits of fixing on the cylindrical portion 24 of the casing a cylindrical cap 42 of horizontal axis (Figs. 7, 8, 9 and 10) called "spark chamber." This chamber contains the electrode holders and the means for adjusting them. The electrode holders are shown at 43—44 on Fig. 8, which is a section of the apparatus by a vertical plane. Furthermore, one of the two electrode holders (the lower one 44) is shown in detail view by Fig. 10. The upper electrode holder 43 is similarly constructed. Electrode 45 is tightly held in conical mandrel 46, which is rigidly fixed to the end of cylindrical rod 47. This rod 47 is slidable in a piece 48 and gas-tightness is ensured by means of packing joint 49. Furthermore, by tightening a collar 50, rod 47 is made rigid with piece 51, which permits, by means of threaded part 52, of imparting thereto small translatory movements along its axis. Once the electrodes have been adjusted in position, the action of part 52 permits of exerting a pressure of the electrodes on the piece of insulator or semi-conductor material which constitutes the support on which the spark is to travel or "slide," as above explained with reference to Figs. 4 and 5.

In particular when the sliding spark system is of the kind illustrated by Fig. 5, it is necesary to achieve a contact of electrodes 11 and 12 with spark support 6 which not only is good but extends over the whole of their cross-section. The particular electrode holder illustrated by Fig. 11 is intended to comply with this condition.

Figures 10, 11, 12:
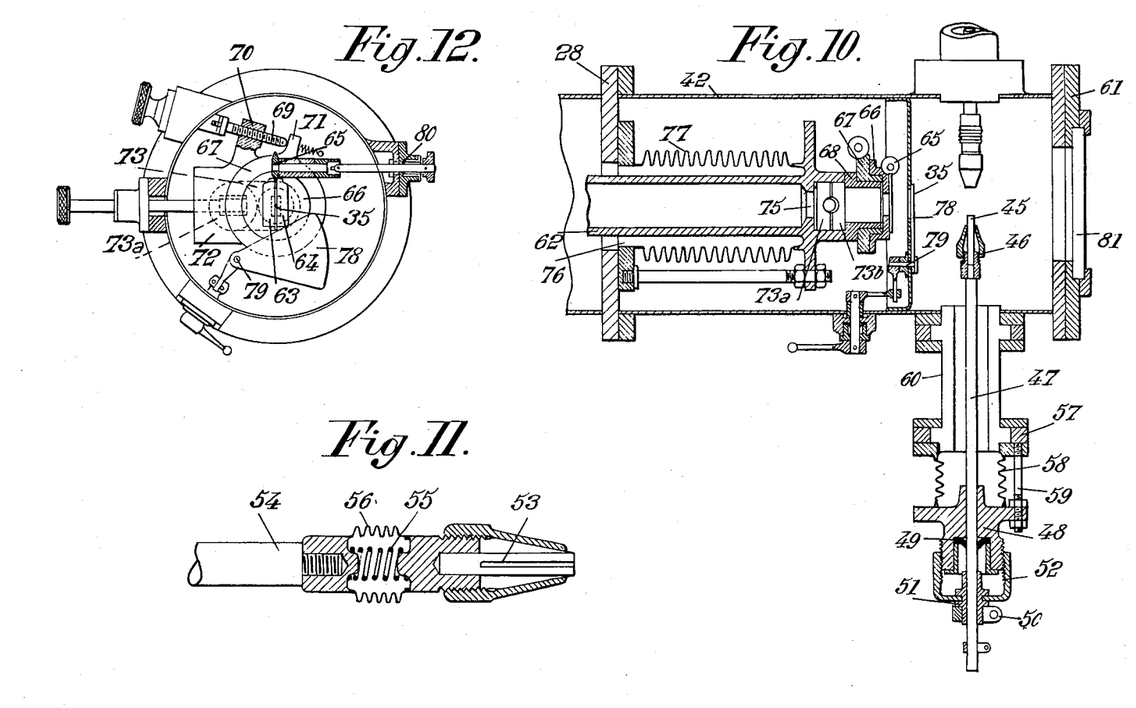
Fig. 10 is a detail view on an enlarged scale showing the arrangement of the electrodes for producing the spark, said figure also showing the details of the entrance slit.
Fig. 11 shows a modification of the arrangement of one electrode.
Fig. 12 is a front view corresponding to Fig. 10.
Figure 13:
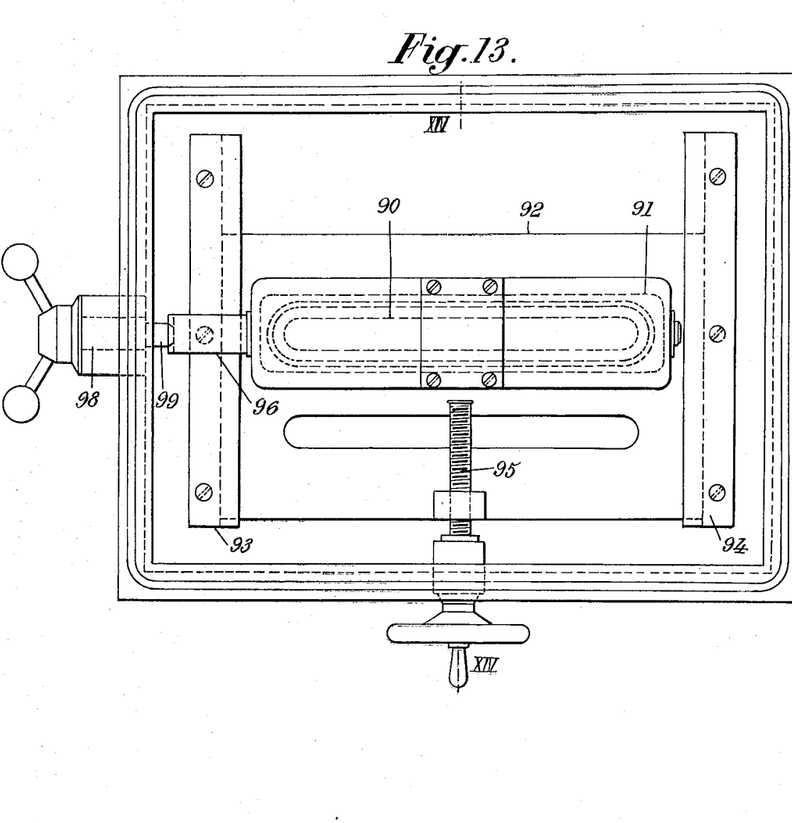
Fig. 13 is a front view of a valve device for separating the photographic recording means from the inside of the casing.

It includes a mandrel 53 which holds an electrode identical to 46, and a sliding rod 54 identical to 47, but in this case the connection between these two elements, instead of being rigid as in the arrangement illustrated by Fig. 10, is flexible. As a matter of fact, elements 53 and 54 are connected together by a spring 55 and they are guided with respect to each other by a kind of bellows 56. This arrangement is used in order to permit a lack of alinement between the axis of mandrel 53 (and therefore of the electrode fixed therein) and the axis of rod 54. However it permits of exerting a given pressure between the electrode and the support owing to the provision of spring 55.

The sliding arrangement of rod 47 (or 54) permits of adjusting the position of electrode 45 in one direction, which is the vertical direction in the arrangement illustrated by the drawings. An adjustment in two other directions located in a horizontal plane perpendicular to the axis of the electrode holders and to the plane of Fig. 10 is also necessary. This adjustment is effected by modifying the direction of rod 47 as follows. The axis of piece 48 is the same as that of rod 47. Piece 48 is connected with piece 57 through a flexible tube, or bellows, 58. Three threaded rods 59 (only one of which is visible on Fig. 10, the two others being located at 120°) permit of effecting this adjustment in an accurate manner and of fixing part 48 with respect to 57 once the first adjustment has been effected. Piece 57 is connected with the spark chamber 42 through a piece 60 made of an electrically insulating material.

The electrodes are inserted and fixed in mandrels 46 manually owing to the provision of a door 61 which, when it is opened, gives access to the inside of chamber 42.

We will now describe entrance slit 35 (Figs. 7, 8, 9, 10 and 12) through which pass the light rays from spark 34 on their way toward grating 36.

On plate 30 there is rigidly fixed a tube 62, called "slit carrying tube." The slit and the mechanism cooperating therewith are shown on Fig. 10 in section by a vertical plane passing through the axis of tube 62. Fig. 12 shows the parts in projection on a vertical plane perpendicular to the axis of tube 62. The parts 63—64 which form the edges of slit 35 may be moved away from each other by means of an eccentric member 65, which permits of adjusting the width of the slit. Parts 63—64—65 and their supports are mounted on a small plate 66 which is rigidly secured to a plate 67. This arrangement permits of quickly substituting for this system 63—64—65—66, another one of different dimensions. Piece 67 is itself mounted on a piece 68 rigid with the slit carrying tube 62. Piece 67 may be given, with respect to piece 68, a movement of rotation about the common axis of these two pieces, which is the axis of the slit carrying tube. Control of this movement is effected through screw 69 (Fig. 12) the nut 70 of which is rigid with 68. Screw 69 exerts a thrust upon a projection 71, rigid with 67, and thus causes this piece to rotate about 68. This arrangement is intended to permit of rotating slit 35 so as to make it parallel to the lines of grating 36 and to the exit slits of the photo-electric receiver device which will be hereinafter described.

Figure 7:
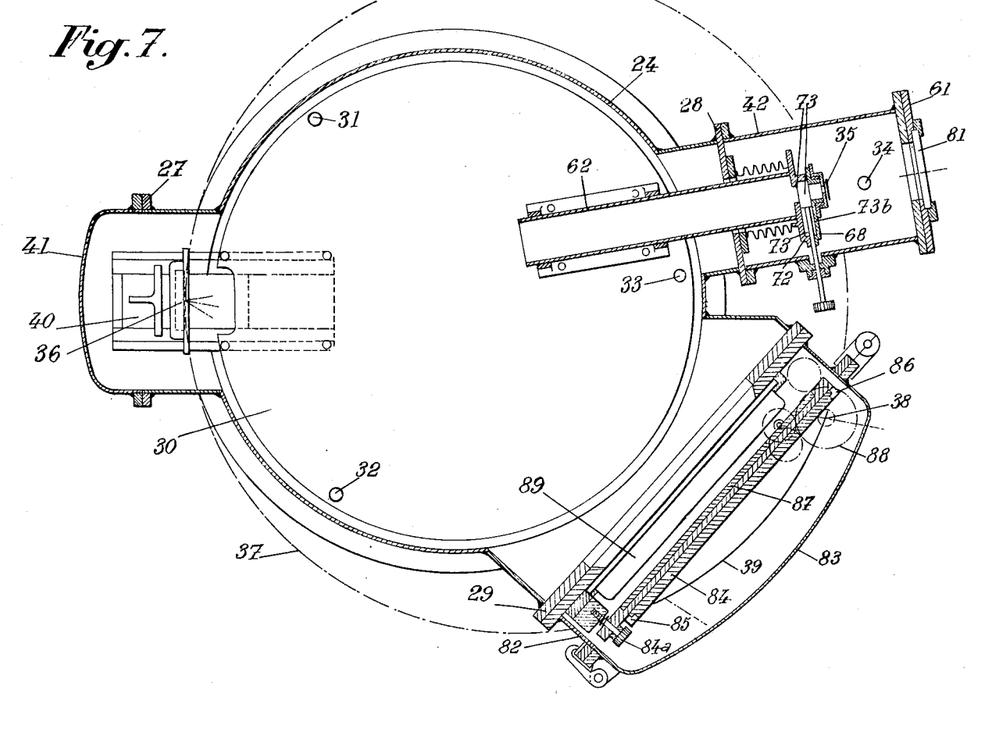
Fig. 7 is a horizontal sectional view of the apparatus according to our invention, this apparatus being fitted with photographic means for recording the spectrum.

The end of the slit carrying tube 62 carries a piece 72 provided with an elongated recess 73 visible on Fig. 7 and shown in dotted lines on Fig. 12. This recess is closed by piece 68. In this recess there is slidably mounted a gas-tight valve shown in the open position on Figs. 7 and 12, said valve including two circular portions 73a—73b, plate 73a being provided with a rubber packing joint. The whole of these two plates may be given a translatory movement in recess 73, so as to come opposite orifice 75. Owing to this arrangement, it is possible to connect chamber 42 with the atmosphere, while maintaining the vacuum in the casing 24, 25 and 26, so that it is not necessary to restore said vacuum in the casing every time chamber 42 is opened, for instance in order to change or adjust the electrodes.

The slit carrying tube 62 penetrates into chamber 42 through orifice 76 provided in flange 28. Gas-tightness between the main casing and the external wall of the slit carrying tube is obtained by means of bellows 77, as shown on Figs. 7 and 10.

Finally, a shutter 78 (Figs. 10 and 12) is mounted rotatable about an axis 79 so as to cut off the light rays from the spark, when so desired.

The different possible adjustments of the mechanisms above described, that is to say: adjustment of the width of the slit, adjustment of the direction thereof, control of the shutter and of the gas-tight parts are effected from the outside owing to the provision of gas-tight packing joints, such as shown at 80 (Fig. 12) concerning the adjustment of the width of the slit. Said packing joints are of the same structure as the device used to permit the sliding displacement of rods 47, as above described.

Door 61 is provided with a window 81 (Figs. 7, 8, 9 and 10) through which it is possible to observe the spark.

We will now describe the device for receiving the rays diffracted from grating 36. Said devices are mounted on flange 29 (Figs. 7 and 9), of rectangular shape. As above stated, it is one of the essential features of the present invention that it is possible to use on the same apparatus either photographic or photoelectric receiving means for the diffracted rays. Either of these two different means is mounted on flange 29.

The photographic device is diagrammatically shown on Fig. 7. This device is contained in a chamber or cap 82 fixed to flange 29 and provided with a door 83 through which it is possible to handle the photographic holder or slide. This holder, which is not shown on Fig. 7, includes two surfaces between which the photographic film is tightly held. These surfaces are of circular cross-section and such that the film extends along the Rowland circle, over the arc 38—39 (Fig. 7) of this circle. The photographic holder is carried by a plate 84 which is movable with a translatory movement in the vertical direction (i.e. in a direction perpendicular to the plane of Fig. 7) owing to the mounting of this plate 84 in slideways 85—86. Thus several images can be recorded on the same film. A shutter including a horizontal slit is mounted at 87 in front of the photographic film holder. This shutter permits of cutting off the light rays and of determining the height of the spectrum lines.

In order to obtain a good coincidence between the points of the photographic film and the Rowland circle 37, the whole of the film holder and of elements 84, 85, 86, 87 is mounted so that it can be given a movement of rotation about a vertical axis (i.e. one perpendicular to the plane of Fig. 7) passing through the central spot 38. This movement is controlled by means of screw 84a.

Control of the operation of the shutter and of the vertical displacements of the film holder is effected from the outside owing to the provision of gas-tight packing joints analogous to those provided for the electrode holders and above described with reference to Fig. 10. As these packing joints are carried by a box or cap 82 and as the parts that are controlled form a whole rotatable about axis 38, transmission of the movement is mechanically obtained through a gear system one of the elements of them (88 of Fig. 7 has its center on said axis 38.

Figure 14:
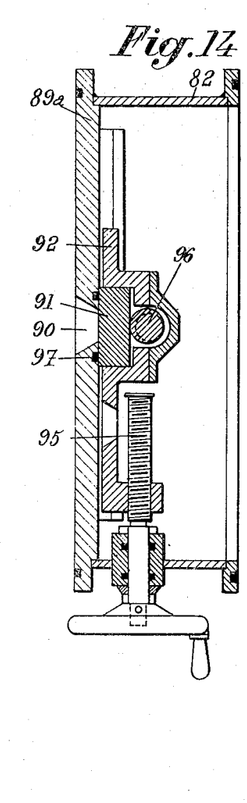
Fig. 14 is a sectional view on the line XIV—XIV of Fig. 13.

Chamber or cap 82 may be separated from the inside of the casing 24—25—26 by a gas-tight valve so as to permit of opening said chamber 82 without destroying the vacuum formed inside said casing 24—25—26. This valve is shown in detail view on Figs. 13 and 14. It comprises a kind of frame 89, closed, toward the inside of casing 24—25—26, by a plate 89a provided with an elongated rectangular horizontal orifice 90 through which pass the light rays which constitute the spectrum to be studied. On this plate 89a is slidably mounted a rectangular plate 91 greater than the orifice to be closed. This plate 91 is engaged in a frame 92 slidable with a vertical translatory motion along plate 89a and guided in slideways 93 and 94. Displacement of this frame is controlled by a screw 95 which is controlled from the outside with the provision of a gas-tight packing joint. In the closed position of the valve device (Fig. 14), plate 91 is brought, by this translatory movement of frame 92, opposite orifice 90. Then a horizontal shaft 96, itself journalled in frame 92 and provided with three cams, is rotated about its axis. The cams then apply plate 91 against the rubber joint 97 of plate 89a, the atmospheric pressure acting from the right toward the left (Fig. 14). In order to open the valve device, shaft 96 is rotated in the opposite direction and the sliding frame 92 is moved upwardly so as to clear the orifice 90. Shaft 96 is controlled from the outside by means of a shaft 98, the connection between said two shafts being obtained through a screw driver arrangement 99, which permits of releasing 92 in the open position.

We will now describe the photo-electric receiving means.

The whole of the photo-electric receiving device is diagrammatically shown by Fig. 9. It comprises a multiplicity of optical slits 101 intended to select the radiations that are studied. These slits are located along a circular piece 100 coinciding with the Rowland circle. A portion of piece 100 is shown on the left hand side of Fig. 15, which is a plan view, and also on the left hand side of Fig. 16, which is a section by a vertical plane of the photo-electric device which is now to be described. Various adjustments of slits 101 are possible. For instance each of said slits may have its width and its height adjusted. Said slits may be rotated about a vertical axis so as to bring the plane of the slit at right angles or at a suitable obliquity to the path of the radiation. Said slits may also be given a translatory motion along the circular edge of piece 100 and a translatory motion at right angles to said edge.

Piece 100, which carries slits 101, rests upon another plate 102, parts 101 and 102 being interconnected in such maner that piece 100 can rotate with respect to piece 102 about a vertical axis passing through the central spot 38.

This arrangement is intended to permit an adjustment to bring all the points of the edge of piece 100 in perfect coincidence with the Rowland circle along which the spectrum is formed with the maximum sharpness. This adjustment is performed by means of screw 103 which moves a lug 104 rigid with piece 100, whereas the nut 105 in which said screw is mounted is rigid with part 102. This movement takes place against the antagonistic action of a return spring 106.

In addition to this, plate 102 is guided by slideways 102a with respect to a plate 107 rigidly fixed to rigid plate 30. A circular ball bearing is interposed between parts 102 and 107.

These slideways cause part 102 (and therefore part 100 which is mounted thereon) to rotate with respect to plate 107 through some degrees about the center R of the Rowland circle. In the course of this rotation, the whole of the exit slits slides along the Rowland circle. This movement of rotation is controlled by a screw 108 the nut 109 of which is rigid with plate 107, said screw 108 acting upon the intermediate plate 102. Plate 107 is bolted on the big plate 30.

It will be seen that, with the arrangement above described, the entrance slit, the diffraction grating and the exit slits are all interconnected through said big plate 30 so that possible deformations of the casing 24—25—26, under the effect of the atmospheric pressure acting thereon, do not modify the respective positions of these elements.

Figure 15:
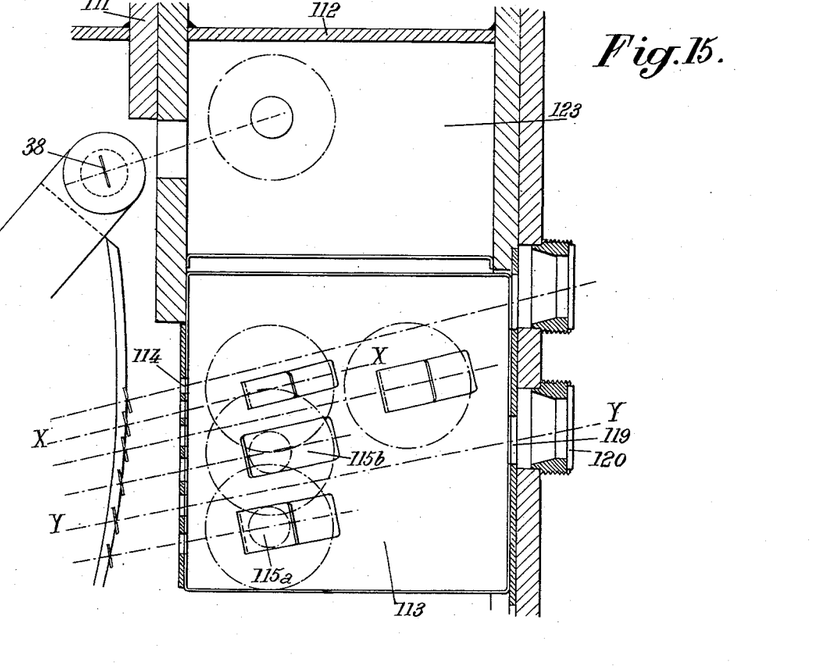
Figs. 15 and 16 are detail views showing, on an enlarged scale, elements of the photo-electric receiver system.
Figure 16:
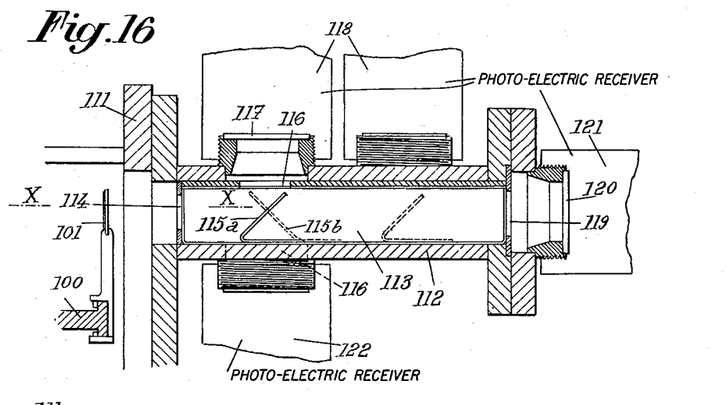

This mechanism is enclosed in a gas-tight box 110 the side wall of which carries the means for controlling the rotation of parts 102 and 100 about the center of the Rowland circle. This box 110 is fixed on the flange 29 of the casing and on the opposite side it carries a flange 111 on which is fitted another box 112 (Figs. 9, 15 and 16) which contains the photo-electric receiver device proper. This box 112 is shown on Fig. 9 in section by a horizontal plane located at the level of the exit slits. A similar sectional view, but corresponding only to the portion of the box relative to short wavelengths, is shown by Fig. 15. Fig. 16 is a section by a vertical plane passing through one of the exit slits.

The light rays such as XX, YY, passing through the exit slits 101, are constituted by electro-magnetic radiations of short wavelength which cannot act directly upon the conventional photo-electric receivers. But these short wavelength radiations are transformed into radiations of higher wavelengths by making use of fluorescence in the manner which will now be described.

Box 112, which is gas-tight, contains a box 113 provided with a multiplicity of holes 114 in its front wall. The light beams having passed through slits 101 pass also through said holes 114. Inside the box 113 are provided screens covered with fluorescent substances. These screens are of two kinds designated by reference numerals 115a and 115b. Screens 115a are inclined at 45° on the horizontal, the fluorescent substance being spread on the front face of said screens, that is to say toward the upper wall of the box. Screens 115b are inclined at 135° and the fluorescent substance is spread on the front faces thereof (left hand side on Figs. 15 and 16) since these faces receive the beams having passed through slits 101. Said faces are therefore directed toward the lower wall of the box. Opposite these screens, in the upper and under walls of box 113 are provided apertures such as 116 through which pass the rays transmitted from the fluorescent substances.

Glass windows, such as 117, are mounted in these apertures and the fluorescence radiations pass through said windows so as to influence the photo-electric receivers such as 118 and 122 (diagrammatically shown in dotted lines) which are located above these windows or under them. Windows 117 are provided with a gas-tight rubber joint, whereas receivers 118 and 122 are located in the atmosphere.

On the other hand, the rear face of box 113 is also provided with apertures such as 119 through which pass rays such as YY across the path of which no screen is interposed. The windows 120 located behind said apertures 119 are coated with a fluorescent substance on the faces thereof turned toward said radiations YY (left hand side on Figs. 15 and 16) and photo-electric receivers are located behind said windows at 121 (Fig. 16).

Therefore, the short wavelength rays are of three kinds:

(1) Those, such as XX, which strike a screen 115a directed toward the top of box 113; the corresponding receivers 118 are placed above said box 113.

(2) Those, such as XX, which strike a screen 115b directed toward the bottom of box 113; the corresponding receivers 122 are disposed below said box 113.

(3) Those, such as YY, which pass throughout box 113 and only strike the fluorescent substance spread on the windows 120. The corresponding receivers 121 are disposed behind box 113.

With such an arrangement, photo-electric receivers of a conventional type are disposed along three walls of box 113 so that their total number is greater than if all the receivers were disposed side by side.

A closed chamber 123 has been provided for the receiver (of an arrangement analagous to 118) which receives the rays directed toward the central spot 38. This chamber 123 is closed because the luminous intensity at 38 is very high and diffused rays could act on the other receivers if the screen (of the type 115a, but not fluorescent) had been placed in the same box 113 as the other screens.

This photo-electric measurement device makes it possible to study several radiations simultaneously for the purpose of obtaining a direct analysis of the elements studied in the material which consitutes the electrodes. The device illustrated by Fig. 15 includes seven receivers (one of which is for the central spot), but this number is not limitative and may be increased or reduced according to the needs.

The apparatus further includes the necessary accessory devices, such as pumping means, means for checking the residual pressure, safety means, etc.

By way of non-limitative example of the applications of the present invention, we will indicate its possibilities for the measurement of sulphur, phosphorus and carbon in steels. For this purpose, we make use of supports made of alumina and of electrodes made of the steel to be studied.

Our experiments have shown that it is possible to use for this purpose the 950.669 A. and 1118.586 A. lines of $P_{IV}$ for phosphorus, the 933.382 A. and 944.517 A. lines of $S_{VI}$ for sulphur and the 977.026 A. and 1176 A. lines of $C_{III}$ for carbon.

The limits of concentration that can be detected average 0.005% for sulphur, 0.005% for phosphorus and 0.01% for carbon.

For this last mentioned element, the electrodes and the support must be perfectly cleaned, both mechanically and by heating, before assembly, so as to avoid errors due to greases or other organic bodies which would introduce into the spectrum the lines of carbon.

Our experiments have shown that a similar application for the measurement of sulphur, phosphorus and carbon could be made in copper, nickel and aluminum. In the case of aluminum, the limit concentrations that can be detected average 0.0005%.

As above stated, this invention may be extended to the case of non-conductive bodies. By way of non-limitative example, our experiments have shown that it is possible to detect sulphur, phosphorus and carbon in alumina and zirconia powders. In a general manner, our invention is applicable to the analysis of any element having intensive lines in the remote ultra-violet range, the element of base being of any nature whatever.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A spectrum analysis apparatus which comprises, in combination, a casing including a cylindrical portion and two end portions having their concavities turned toward the outside of said casing, said cylindrical portion being provided with at least two apertures both located on the same side of a diametral plane of said portion, a rigid plate at right angles to the axis of said cylindrical portion carried by said casing at at least three points thereof, a rigid support secured to said plate and extending through one of said apertures, means forming an entrance slit for the beam of rays to be analyzed carried by the outer end of said support, a cap fitted in gas-tight fashion on said last mentioned aperture and surrounding the portion of said support that projects from said last mentioned aperture, said cap also surrounding said entrance slit, means carried by said cap in the portion thereof on the outer side of said entrance slit for producing a spark opposite said slit, said last mentioned means including two electrodes and a piece of a material of the group consisting of insulators and semi-conductors, said piece extending between said electrodes and being in tight contact therewith, the inside of said cap being in communication with the inside of said casing, means carried by said casing forming a diffraction grating arranged to diffract the rays from said entrance slit toward the second of said casing apertures, measurement means adapted to be fitted in gas-tight fashion on said second mentioned aperture for analysis of the diffracted rays from said grating, and means for creating a vacuum in the whole of said casing and the closed spaces of said cap and said measurement means in communication with the inside of said casing.

2. A spectrum analysis apparatus which comprises, in combination, a casing including a cylindrical portion and two end portions having their concavities turned toward the outside of said casing, said cylindrical portion being provided with at least two apertures both located on the same side of a diametral plane of said portion, a rigid plate at right angles to the axis of said cylindrical portion carried by said casing at at least three points thereof, a rigid support secured to said plate and extending through one of said apertures, means forming an entrance slit for the beam of rays to be analyzed carried by the outer end of said support, a cap fitted in gas-tight fashion on said last mentioned aperture and surrounding the portion of said support that projects from said last mentioned aperture, said cap also surrounding said entrance slit, means carried by said cap in the portion thereof on the outer side of said entrance slit for producing a spark opposite said slit, said last mentioned means including two electrodes and a piece of a material of the group consisting of insulators and semi-conductors, said piece extending between said electrodes and being in tight contact therewith, the inside of said cap being in communication with the inside of said casing, means carried by said casing forming a diffraction grating arranged to diffract the rays from said entrance slit toward the second of said casing apertures, a rigid support fixed to said plate and extending through said second aperture, photo-electric receiver means for analysis of the diffracted rays from said grating mounted on said last mentioned support, a cap fitted in a gas-tight fashion on said second aperture surrounding at least a portion of said receiver means, the inside of said last mentioned cap being in communication with the inside of said casing, and means for creating a vacuum in the whole of said casing and said caps.

3. A spectrum analysis apparatus having an entrance slit and diffraction grating disposed in a Rowland circle which comprises, in combination, a casing including a cylindrical portion and two end portions having their concavities turned toward the outside of said casing, said cylindrical portion being provided with at least two apertures both located on the same side of a diametral plane of said portion, a rigid plate at right angles to the axis of said cylindrical portion carried by said casing at at least three points thereof, a rigid support secured to said plate and extending through one of said apertures, means forming an entrance slit for the beam of rays to be analyzed carried by the outer end of said support, a cap fitted in gas-tight fashion on said last mentioned aperture and surrounding the portion of said support that projects from said last mentioned aperture, said cap also surrounding said entrance slit, means carried by said cap in the portion thereof on the outer side of said entrance slit for producing a spark opposite said slit, said last mentioned means including two electrodes and a piece of a material of the group consisting of insulators and semi-conductors, said piece extending between said electrodes and being in tight contact therewith, the inside of said cap being in communication with the inside of said casing, means carried by said casing forming a concave diffraction grating arranged to diffract the rays from said entrance slit toward the second of said casing apertures, a rigid support fixed to said plate and extending through said second aperture, photo-electric receiver means for analysis of the diffracted rays from said grating mounted on said last mentioned support, a cap fitted in a gas-tight fashion on said second aperture surrounding at least a portion of said receiver means, the inside of said last mentioned cap being in communication with the inside of said casing, means for creating a vacuum in the whole of said casing and said caps, said photo-electric receiver means being detachably mounted on said second mentioned rigid support, and said second mentioned cap being detachably fitted on said second aperture, so that the whole of said receiver means and of said second cap can be removed from said casing, another cap adapted to be fitted in gas-tight fashion on said second aperture and photographic recording means mounted inside said third mentioned cap, whereby the apparatus can be used as well for photographic recording as for photo-electric analysis.

4. An apparatus according to claim 3 in which said casing cylindrical portion is provided with a third aperture, further including a cap fitted in gas-tight fashion on said third aperture so as to form an extension of said casing, and a support rigid with said plate extending into said casing extension and carrying said diffraction grating.

5. An apparatus according to claim 1 further including gas-tight means manually operable from the outside of said cap for separating at will said entrance slit from the inside of said casing, said cap being provided with a gas-tight door to permit access thereinto from the outside.

6. An apparatus according to claim 3 in which said photographic recording means include a photographic holder plate perpendicular to said rigid plate in said casing, said holder plate being carried by said third mentioned cap and being slidable with respect thereto in a direction parallel to the axis of said casing.

7. An apparatus according to claim 3 in which said photographic recording means include a photographic holder plate perpendicular to said rigid plate in said casing, said holder plate being pivotable in said third mentioned cap about an axis parallel to the axis of said casing and passing through the central spot of the Rowland circle corresponding to said entrance slit and said diffraction grating.

8. An apparatus according to claim 3 in which said photographic recording means include a photographic holder plate perpendicular to said rigid plate in said casing, said holder plate being carried by said third mentioned cap, gas-tight means manually operable from the outside of said cap for separating the portion of said third mentioned cap which contains said holder plate from the inside of said casing, said third mentioned cap being provided with a gas-tight door to permit access to said holder plate from the outside.

9. An apparatus according to claim 8 in which said gas-tight means include a partition between said portion of said third mentioned cap and the inside of said casing, said partition being provided with an elongated opening, an elongated plate slidable along said partition on the side thereof where is located said portion of said third mentioned cap, said elongated plate being capable of closing said elongated opening, a sliding frame movable along said partition on said last mentioned side thereof, said sliding frame being provided with a recess for housing said elongated plate, said elongated plate being slidable in said sliding plate in a direction at right angles to said partition, said elongated plate being held practically without play in said recess in the direction of sliding displacement of said sliding frame along said partition, cam means between said sliding frame and said elongated plate for applying said elongated frame strongly against said partition to cover said elongated opening, gas-tight means manually operable from the outside of said third mentioned cap for actuating said cam means, and gas-tight means manually operable from the outside of said third mentioned cap for moving said sliding frame along said partition.

10. An apparatus according to claim 2 in which said photo-electric means include a frame carried by said last mentioned support, a multiplicity of means for forming slits for rays diffracted from said grating, said last mentioned means being carried by said frame, a multiplicity of fluorescent screens carried by said second mentioned cap each behind one of said last mentioned slits to receive said rays having travelled therethrough, said screens being oblique to the paths of travel of said rays respectively, and photo-electric receivers mounted on said second mentioned cap on the outside thereof to receive the rays retransmitted from said screens respectively.

11. An apparatus according to claim 10 in which said screens are oblique in two directions at right angles to each other so that said photo-electric receivers are located on two opposite walls of said second mentioned cap.

12. An apparatus according to claim 11 in which said second mentioned cap is further provided on a third wall thereof with windows for the direct passage of rays from some of said last mentioned slits, said windows being coated with a fluorescent material, and photo-electric receivers located behind said windows.

References Cited in the file of this patent

UNITED STATES PATENTS

| | | |
|---|---|---|
| 1,948,941 | Olpin | Feb. 27, 1934 |
| 2,453,164 | Swings | Nov. 9, 1948 |
| 2,544,078 | Glassbrook | Mar. 6, 1951 |
| 2,549,574 | Condiff | Apr. 17, 1951 |
| 2,554,321 | Bray | May 22, 1951 |
| 2,743,646 | Strong | May 1, 1956 |